(12) United States Patent
Mosing et al.

(10) Patent No.: US 6,485,061 B1
(45) Date of Patent: Nov. 26, 2002

(54) THREADED TOOL JOINT FOR CONNECTING LARGE DIAMETER TUBULARS

(75) Inventors: Donald E. Mosing, Lafayette; David L. Sipos, Youngsville, both of LA (US)

(73) Assignee: Frank's Casing Crew and Rental Tools, Inc., Lafayette, LA (US)

( * ) Notice: Subject to any disclaimer, the term of this patent is extended or adjusted under 35 U.S.C. 154(b) by 0 days.

(21) Appl. No.: 09/411,602

(22) Filed: Oct. 1, 1999

Related U.S. Application Data

(63) Continuation-in-part of application No. 09/098,394, filed on Jun. 16, 1998, now Pat. No. 6,120,067, and a continuation-in-part of application No. 08/643,970, filed on May 7, 1996, now Pat. No. 5,810,401.

(51) Int. Cl.$^7$ ................................................. F16L 15/00
(52) U.S. Cl. ........................ 285/93; 285/334; 285/333; 285/390
(58) Field of Search .......................... 281/93, 333, 334, 281/390

(56) References Cited

U.S. PATENT DOCUMENTS

| | | | | |
|---|---|---|---|---|
| 1,606,941 A | * | 11/1926 | Holman ........................ | 285/93 |
| 3,468,563 A | * | 9/1969 | Duret ............................ | 285/93 |
| 3,480,300 A | * | 11/1969 | Jeffery et al. ................. | 285/93 |
| 4,349,910 A | * | 9/1982 | Belz ............................. | 285/93 |
| 4,703,492 A | * | 10/1987 | Sekiguchi et al. ............ | 373/91 |
| 4,964,305 A | * | 10/1990 | Raulins ........................ | 285/93 |
| 5,507,538 A | * | 4/1996 | Phillips ........................ | 285/334 |
| 5,788,401 A | * | 8/1998 | Drenth ......................... | 285/334 |
| 5,810,401 A | * | 9/1998 | Mosing et al. .............. | 285/333 |
| 6,120,067 A | * | 9/2000 | Mosing et al. .............. | 285/333 |

FOREIGN PATENT DOCUMENTS

| | | | | |
|---|---|---|---|---|
| GB | 2220716 | * | 1/1990 | ................... 285/93 |
| JP | 40-5071677 | * | 3/1993 | ................... 285/93 |

* cited by examiner

*Primary Examiner*—Eric K. Nicholson
(74) *Attorney, Agent, or Firm*—The Matthews Firm

(57) ABSTRACT

A connector for connecting large tubulars of the type used in oil well tubing, casing and the like, without resorting to welding, to form a pipe string for use in drilling. The connector comprises a pin and box threaded connection having guiding surfaces integral with the pin and box members to facilitate the threaded connection of large tubulars. Alignment indicators may be used to provide that initial thread contact is near 360° around the circumference of the connector to provide a more even distribution of the initial contact forces on the threads rather than substantially all force acting on a smaller area of thread. This alignment also speeds the makeup of the pipe. A thread factor is provided with a desired axial length and radial length to avoid deformation of the threads. The tubular alignment using alignment indicators, centralizing effect of guidance surfaces, and thread factor may work in combination to improve the reliability, durability, and speed of making the connection.

24 Claims, 8 Drawing Sheets

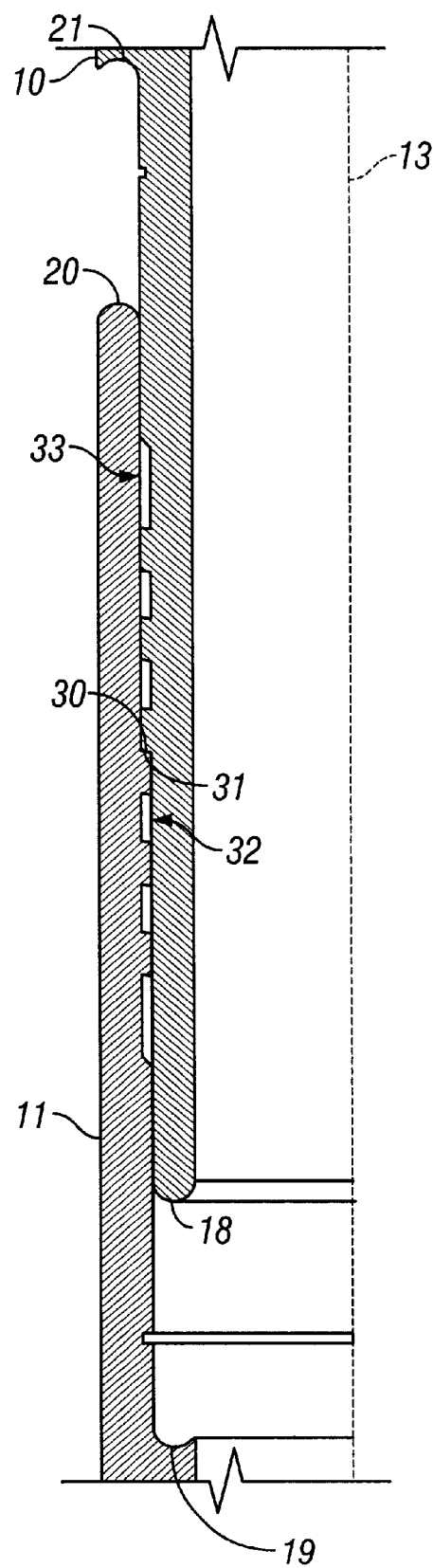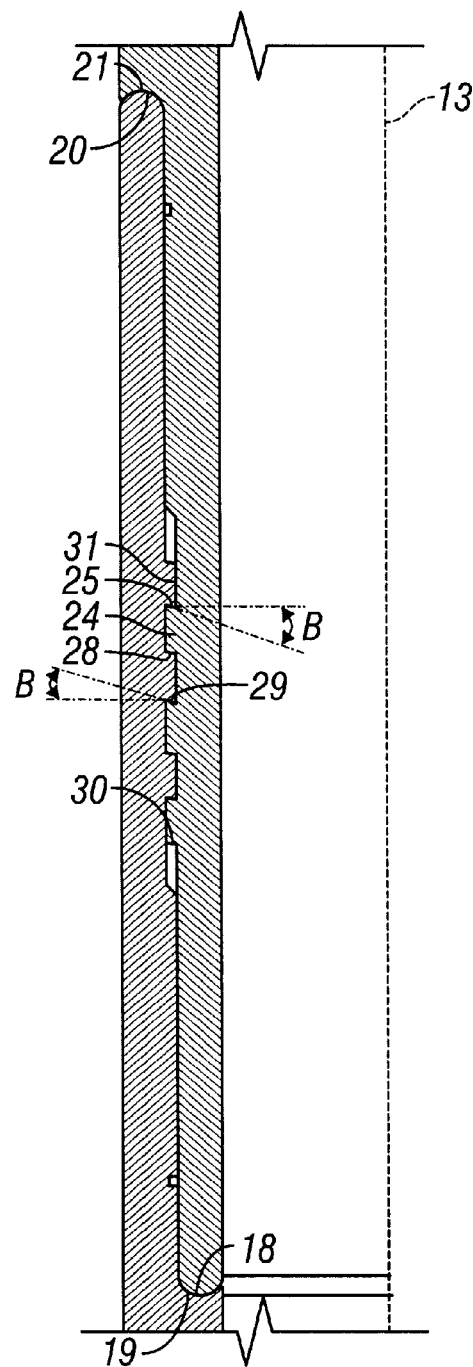
FIG. 4
FIG. 5

0°  90°  180°  270°  360°
AZIMUTH

THREADED TOOL JOINT FOR CONNECTING LARGE DIAMETER TUBULARS

TECHNICAL FIELD

This is a continuation-in-part of U.S. patent application Ser. No. 08/643,970 filed May 7, 1996, which issued Sep. 22, 1998 as U.S. Pat. No. 5,810,401, and U.S. patent application Ser. No. 09/098,394 filed Jun. 16, 1998 now U.S. Pat. No. 6,120,067. The present invention relates to pipe connectors, particularly, but not exclusively, for use in connecting sections of a pipe string for drilling related purposes. More specifically, it relates to the design of a pin and box connection of the type used in oil well tubing, casing, and the like and is especially useful for larger size tubulars such as those twenty-four inches in diameter and greater. The invention provides a unique method of guided insertion and a thread with a ratio of its axial length to its radial length that improves reliability for the large stresses encountered with large tubulars. The threaded joint preferably has dual mating shoulders and nose faces on the box members. The dual mating shoulders substantially improve the joint's ability to withstand the intense axial compression loading that occurs when driving the pipe into the ground. A significant advance in the art is achieved by providing a threaded joint for large tubulars of the types described which permits the large tubulars to be connected one to another by threaded means without the use of a weld bead between the tubulars, and yet still provide a reliable connection capable of withstanding the axial compression loads of drilling or other industrial scale uses.

BACKGROUND ART

Connecting large diameter tubulars, such as metal well bore tubulars which are lowered down hole in oil wells, has been problematic in the art. Large tubulars, for example tubulars comprising an external diameter of two feet or greater, are cumbersome and generally have to be handled by using powerful machines to grip and position the tubulars. Connecting such tubulars by means of threaded connections has been impractical because of the precision required in positioning and turning the cumbersome large tubulars. As a consequence of the difficulty and impracticality of using threaded connections for large tubulars, such tubulars are generally connected by way of welding. Even where an initial connection is made by threaded engagement, it is a common practice in the art to reinforce or secure the connection with weld beads.

To connect large tubulars by welding, the tubular members may be stationary, so no manipulation, turning, or precision placement of the tubulars is required. However, welding is very time consuming, expensive, and requires highly skilled personnel to perform. A connector for rapidly and securely connecting large tubulars by threaded engagement without the use of welding is useful to avoid the time, expense and expertise required for a welded connection.

Another problem is that the threads necessarily have a very large load and tend to be susceptible to forces, as discussed further hereinafter, that may distort the shape of the threads. Moreover, when initially starting the threaded contact the threads are easily damaged. Preferably, a threaded connection should be designed so that when made up the axial compression loads acting on the connection joint are not born solely by the threads of the connection; instead, the loads should be born as much as possible by the shoulders and nose faces of the connector so that the integrity of the threads is maintained. Further, a threaded connection should be able to be made up quickly.

Threaded connections between pipe members are typically made by providing one end of one pipe member with a male connector in the form of an externally threaded pin member, and providing one end of a second pipe member with a female connector in the form of an internally threaded box member which receives the pin member. The pin and box members may be integral parts of their respective pipe members, or may be added thereto by welding or threaded engagement.

In the past, several different types of threaded connections have been designed to manage the extreme compressive, tensile, and bending forces to which the connection is exposed. Several prior art designs incorporate internal and/or external mating shoulders and end faces on the pin and box members. As used in herein, the terms "end face" and "nose face" are interchangeable. In several designs, the mating shoulders are used as torque shoulders to stop axial advancement of the pin and box members during make up of the joint. In many designs, the mating shoulders are also used to provide resistance to axial compression during pile driving. Although many prior art designs use a combination of external and internal shoulders, these designs are usually configured such that only one of the shoulders will mate with its corresponding nose face upon initial makeup of the joint. These designs rely on either the external or the internal shoulder alone to mate with its corresponding nose face at initial make-up of the joint, with the other shoulder remaining axially spaced from its corresponding nose face at initial make-up of the joint. Some designs may never mate or have shoulders that only make contact with the corresponding nose face after the threads or other portions of the joint begin to yield.

It is therefore one object of the present invention to provide a threaded connection design that uses dual mating shoulders in which both external and internal shoulders mate with their corresponding nose faces during initial make-up of the joint. By providing dual mating shoulders, the shoulders share axial compression loads and provide the joint with improved performance in resisting the extreme axial compression loads encountered during pile driving.

In addition to providing resistance to axial compression loading, the dual mating shoulders in the present invention also function as torque shoulders to stop axial advancement of the pin and box members during make-up of the joint.

In several prior art designs, the threaded connections use converging or wedge-type thread flanks rather than shoulders to act as a torque stop. As used herein, the terms "converging" and "wedge-type" are interchangeable. In general, the pin and box threads in a converging thread flanks connection have progressively changing axial widths. The axial thread width of the pin member progressively decreases in the direction of the mouth of the pin member over the length of the thread structure. The axial thread width of the box member, on the other hand, progressively decreases in the opposite direction, such that a pair of pin and box members in the fully made up condition have a mutual wedging interfit. When converging threads are screwed together and wedging between the flanks takes place, the torsional resistance of the connection increases as the thread flanks act as torque stops to axial advancement of the pin and box members. Several other thread connection designs use tapered buttress-type thread forms that rely on radial interference to stop axial advancement of the pin and box members during make-up. In a tapered threads configuration, the radial interference fit forms as the crests and roots of the pin and box threads converge upon make-up of the joint.

Although these thread form designs may succeed in providing a torque stop to halt axial advancement of the pin and box members during make-up, and also allow the threads to provide resistance to axial compression loading, thus taking pressure off any pin and box shoulders that may be used in the design, such use of an interference fit in the thread form has its drawbacks. Such uses of interference fits in the form may create high surface contact stresses on the threads, which can cause galling and other localized thread damage that can severely limit the number of times the connection can be made up. In addition to limiting the repetitive use of the threads, the areas of high surface contact stress are susceptible to stress corrosion cracking, known as sulfide stress cracking, that occurs in petroleum well conduits. In one embodiment of the present invention, a threaded joint connection that uses the shoulders of the pin and box members rather than the threads functions as a torque stop.

Conventionally, the pin member of the joint is tapered inwardly from the proximal end of the threaded portion to the distal end to mate with a similarly tapered female threaded box member. The taper facilitates entry of the pin member in to the box member. Although the taper facilitates entry of the pin member, the wall thickness at the nose face end of a tapered thread form is often very small, especially in the flush joint configuration. Although the wall thickness at the shoulder of the pin and box member may be a substantial portion of the pipe wall thickness, with the shoulder occupying only a small portion of the wall, the wall thickness at the nose face end may be very small. This tapered configuration leaves the nose face end with a reduced wall thickness that must withstand the extreme axial compression during pile driving, as well as the extreme tensile, compressive, and bending forces. to which the pipe is exposed downhole.

Additionally, although a tapered thread form may facilitate entry of the pin and box members during make-up of the joint, tapered threads are still susceptible to cross-threading if the pin and box members are not properly aligned at the point of threaded engagement. One example of an apparatus designed to prevent cross-threading is found in U.S. Pat. No. 4,407,527, issued to Mr. Larry E. Reimert. The Reimert patent discloses a guide surface axially spaced from the internal threads of the box member to constrain the relative orientation between the pin and box members prior to threaded engagement. Although the Reimert design may be successful in preventing cross-threading, we have found that the guiding means may also integrate into a mating shoulder configuration by axially spacing the nose face from the thread on the pin and box members.

Those skilled in the art will appreciate the present invention that addresses the above and other problems.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 4 is a split elevational view, in cross-section of the threaded connection prior to make-up of the joint.

FIG. 5 is a split elevational view, in cross-section, of the threaded connection in the fully made-up condition the present invention.

GENERAL DESCRIPTION AND PREFERRED MODE FOR CARRYING OUT THE INVENTION

Figure 1:
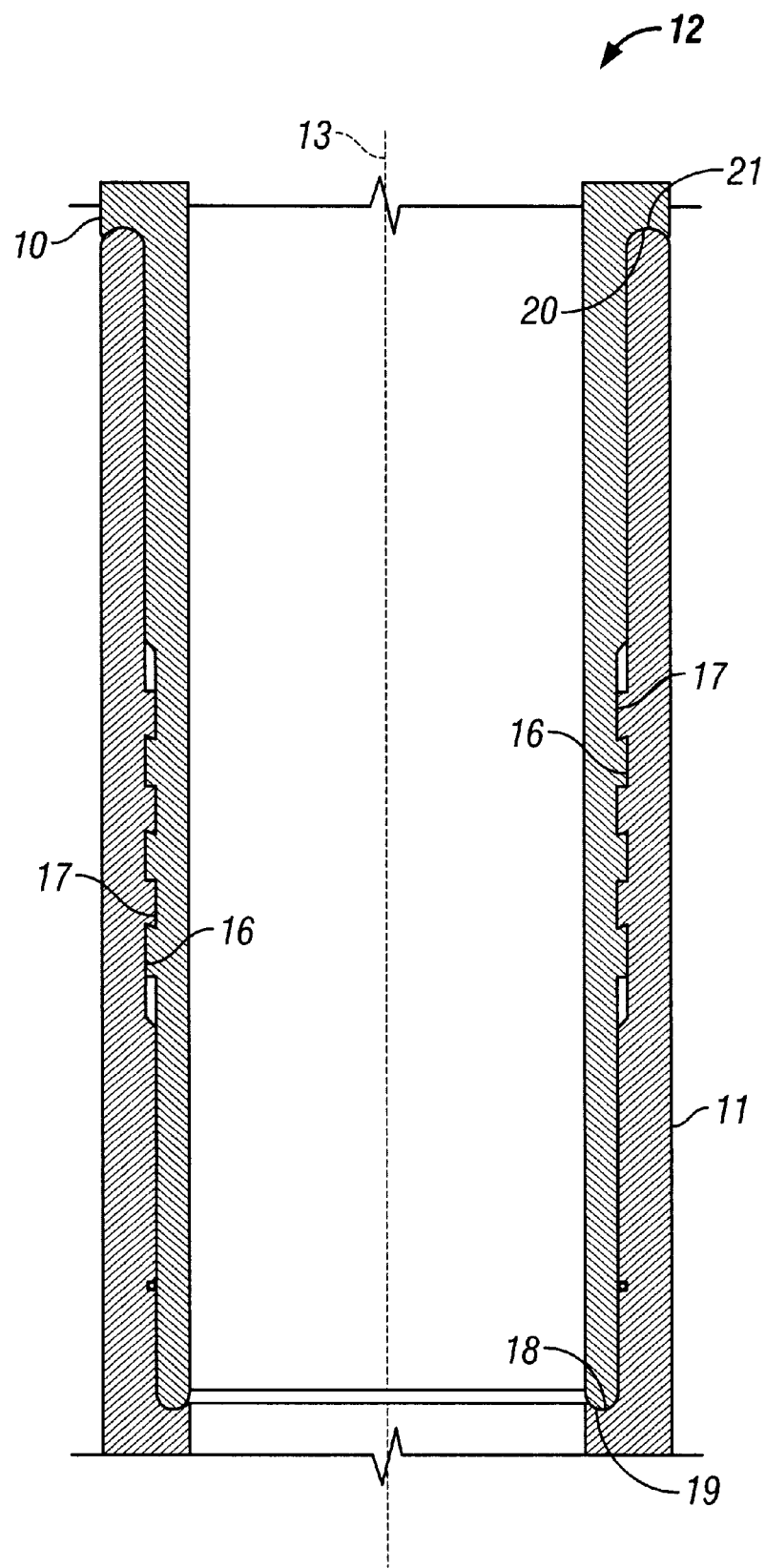
FIG. 1 is an elevational view, in cross-section, of a tool joint constructed in accordance with this invention.

FIG. 1 shows a cross-sectional view of a threaded connection according to the present invention with pin member 10 and box member 11 in a fully made-up condition. FIG. 1 shows upper pin member 10 secured into lower box member 11 to form a threaded connection, designated generally as 12, along axis 13. In a preferred embodiment, threaded connection 12 has mating pin member 10 and box member 11 having outside diameters and inside diameters substantially identical for each of the two members. This is commonly referred to as a flush connection when assembled. The flush connection is preferred in practice to avoid irregularities on the outer surface of the joint that cause resistance when driving the casing into the ground or when running the pipe through the well bore. Although the flush connection is preferred, the present invention is not limited to flush connections, nor is the invention limited to the pin member 10 and box member 11 being integral parts of their respective pipe members. Pin and box members 10, 11 may be integral with their respective pipe members, or may be added thereto by welding or threaded engagement.

Still referring to FIG. 1, threaded connection 12 includes pin member threads 16 that are adapted to be made-up with box member threads 17. Also shown in FIG. 1 are pin member nose face 18, box member shoulder 19, box member nose face 20 and pin member shoulder 21.

Figure 2:
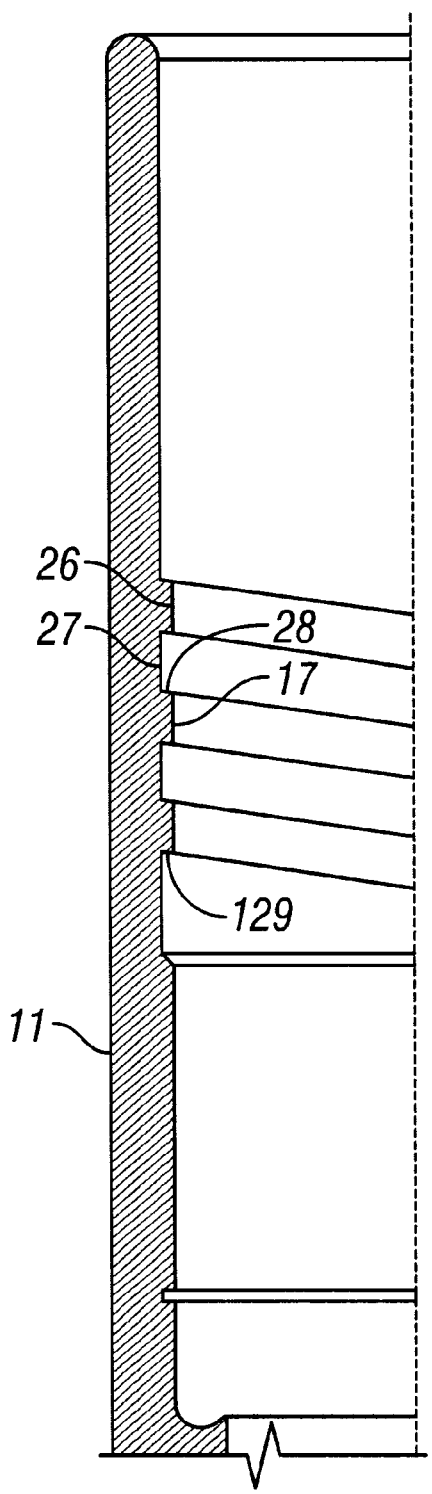
FIG. 2 is a split elevational view, in cross-section, of a box member.

FIG. 2 shows a partial cross-section of the box member 11. Box member 11 includes box member threads 17 having box thread crests 26 and roots 27. Box member threads 17 also include stab flanks 28 and load flanks 29. For box member 11, the term "stab flank" refers to the side of the thread facing inwardly towards the joint, and term "load flank" refers to the side of the thread facing away from the joint.

Figure 3:
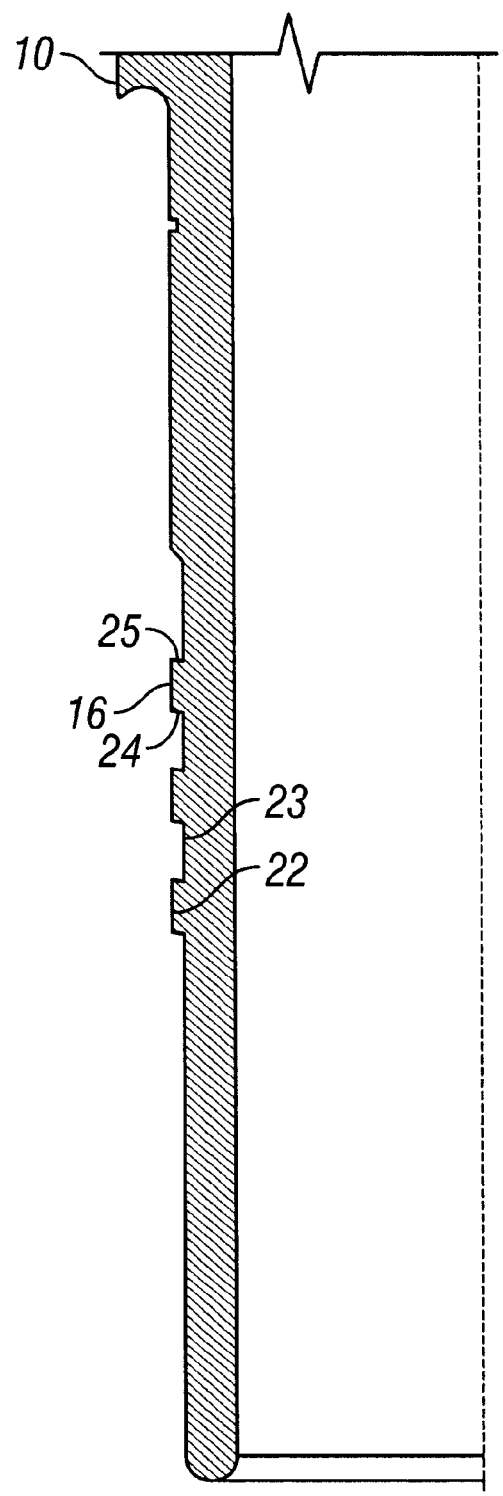
FIG. 3 is a split elevational view, in cross-section, of a pin member.

FIG. 3 shows a partial cross-section of the pin member 10. Pin member 10 includes pin member threads 16, which have pin thread crests 22 and roots 23. Also shown are pin member stab flanks 24 and load flanks 25 which are oriented on opposite sides with respect to the box threads 17 (not shown in FIG. 3).

Figure 11:
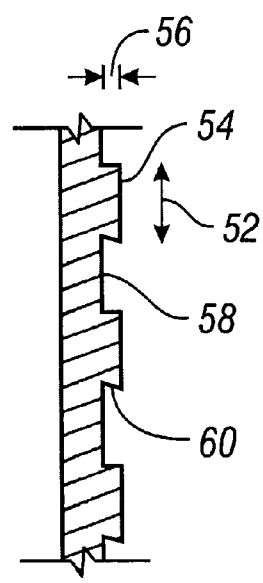
FIG. 11 is an elevational view, in section, showing a presently preferred thread axial and radial length factor in accord with the present invention.

FIG. 11 shows an enlargement of a presently preferred configuration of the threads, preferably including both pin and box threads. The pin threads would be represented by inverting the view of FIG. 11. However, the dimensions of the threads are provided to obtain a decreased likelihood of thread failure. In this configuration, axial length 52 of crest surface 54 is approximately four times greater than radial length 56. Radial length 56 is the radial distance between root surface 58 and crest surface 54. The axial length of the root surfaces 58 will also preferably be approximately four times greater than the radial length 56. While a preferred embodiment has this factor preferably equal or greater than about four, the factor should be at least about three and one-half. It has been found that thread failure occurs much less frequently as the ratio of four to one is approached. The factor may be desirably greater than four as the pipe diameters become larger and may also depend on the dimensions of the threads, but in a presently preferred embodiment the factor is about four. By way of example and not limitation, in a twenty-four inch tubular a thread may have axial length 52 of about one-half inch and radial length 56 of about one-eighth inch. The factor of four is chosen because this configuration has been strong enough to resist the large forces acting on the threads. The dimensions of the threads should also be selected to be large enough for sufficient strength in handling the large forces involved.

Preferably, prior to making up the pipes, the threads are cleaned such as by sandblasting. These threads also show a hooked flank 60 as one preferred embodiment but the invention is not intended to be limited to such a design. The threads could be flat without a hook.

FIG. 4 shows a partial cross-section of the threaded connection prior to final make-up. The figure shows the connection at the point of threaded engagement at which the first stab flank 30 on the pin member contacts the first stab flank 31 on the box member. In this position, one can see that the axial spacing between the nose face 18 and the first stab flank 30 on the pin member, and the axial spacing between the nose face 20 and the first stab flank 31 on the box member, form guiding surface 32 on the pin member and 33 on the box member. These guiding surfaces facilitate entry of the pin into the box member and function as self centering means to align pin and box members 10, 11 upon threaded engagement to avoid cross-threading. This configuration prevents cross-threading by constricting the relative orientation of pin and box members 10, 11 at the point of threaded engagement. The axial length of the guide surfaces 32, 33 may vary. For instance, the axial length of the guide surface as indicated by the embodiment exemplified in FIG. 9 through 13 is somewhat less than the axial length of guide surfaces 62, 64 shown in FIG. 9 and FIG. 10.

FIG. 5 shows threaded connection 12 in a fully made-up condition. The tolerances of the thread form are designed so that when the joint is fully made-up, although load flanks 25, 29 are in intimate contact, clearances remain between stab flanks 24, 28, 30, and 31 to ensure that compressive loads on pin and box members 10, 11 are transferred substantially through box and pin shoulders 19, 21 rather than through the thread form. FIG. 5 shows stab flanks 24, 28, 30, and 31 as substantially square. Load flanks 25 and 29 form a "non-positive" or "reverse" angle, or may form a trapped angle, to create a trapped or hooked thread. In this configuration, the thread crest extends over the thread root. The non-positive angled load flanks help ensure that the threads do not slip out and become disengaged during axial loading tension.

Figure 6:
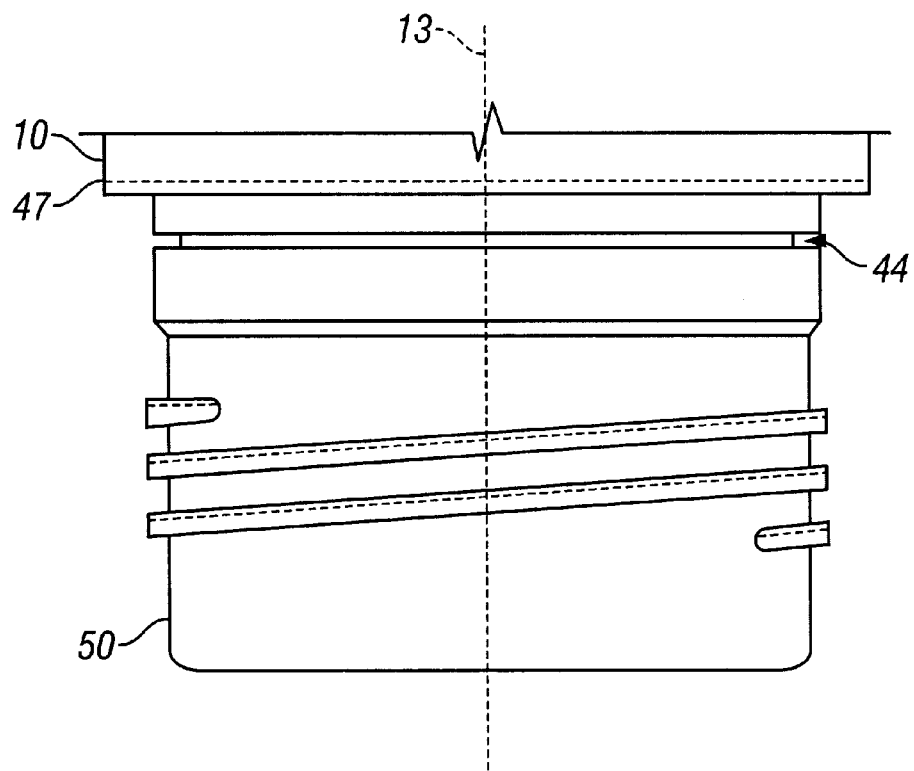
FIG. 6 is an elevational view of the lower end of a pin member.
Figure 7:
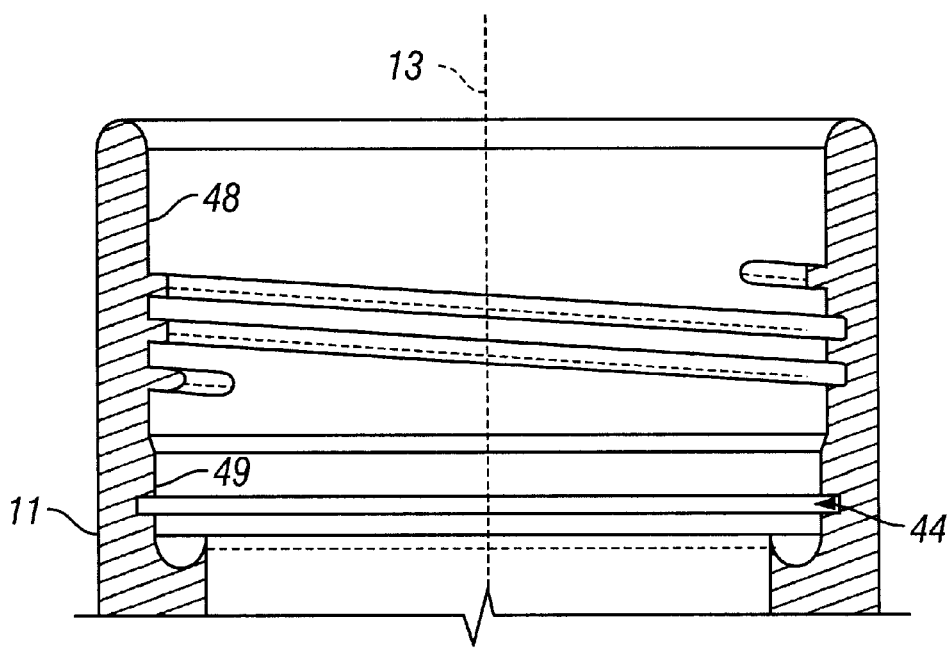
FIG. 7 is an elevational view, in cross-section, of the lower end of a box member.

FIG. 6 shows the lower end of pin member 10. FIG. 7 shows a cross-section of the upper end of box member 11. Seal groove 44 is identified in FIGS. 6 and 7. Seal groove 44 on pin member 10 is located proximate shoulder region 47 of pin member 10 and seal groove 44 on box member 11 is located proximate shoulder region 49 of box member 11. Each of these seal grooves 44 may be used to contain an elastomer ring, such as seal 66, shown in FIG. 13, or a metal seal to seal pin 10 and box 11 members from leakage. The connection may be designed to include one or both of these seal grooves 44 or may be configured to not include either seal groove 44. Regardless of whether seal groove 44 is included in the design, the annular shoulder region 47 (see FIG. 9) of pin member 10 functions as a seal against the annular end region 48 of box member 11 (See FIG. 10) and the annular shoulder region 49 of box member 11 seals against the end region 50 of pin member 10. As described above, the annular shoulder regions function to provide a guiding/stop surface as well as a sealing surface.

Figure 8:
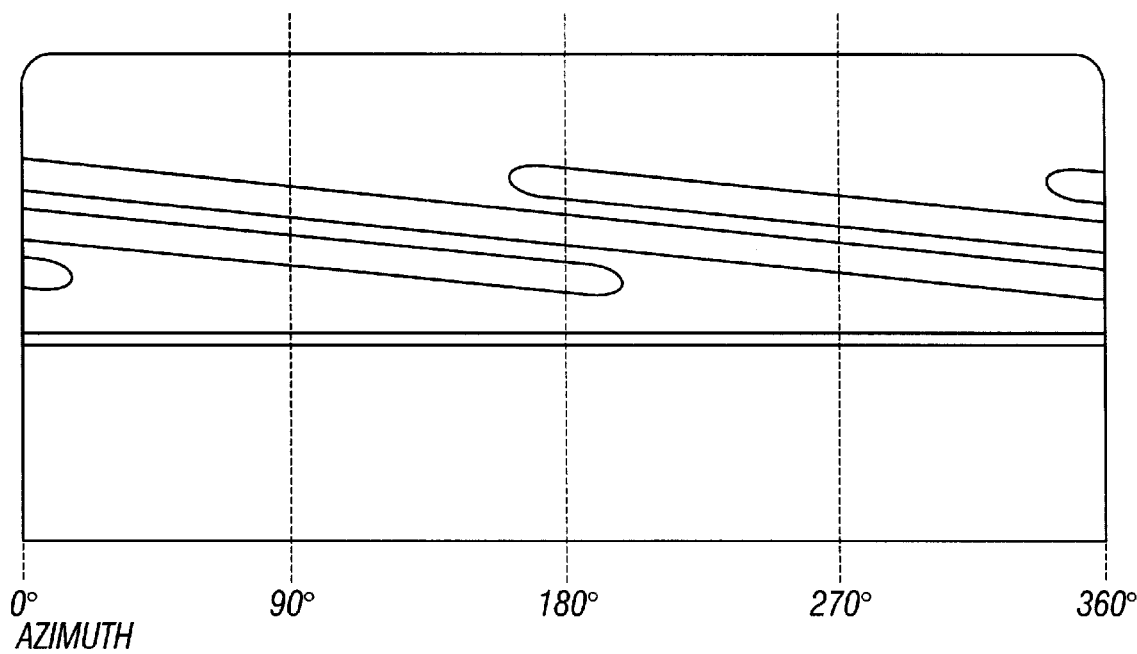
FIG. 8 is a flat layout view of a box member in accord with one embodiment of the present invention.

FIG. 8 shows an inner diameter surface flat layout view of box member 11. The preferred double lead thread from can be seen more clearly in this flat layout view. As can be seen from this figure, the threads are configured to allow the joint to be fully made-up in approximately one and one-half turns. This quick make-up feature provides significant advantages in the field. The present invention can be configured with a single lead thread form or a multiple (two or more) lead, but the preferred embodiment uses a multiple lead thread design because it has been found to provide a stronger connection. The multiple lead thread design also contributes to the quick make-up feature of the present invention because a double thread will advance twice as far as a single thread for each turn of the connection. While one and one-half threads may be used in one embodiment, another embodiment may have more threads to further enhance strength of the connection.

FIGS. 9, 10, 12, and 13 show a presently preferred embodiment of the present invention that uses approximately six threads. It will be noted that the four-to-one factor for the threads is not indicated so as to better illustrate other desirable features of the present invention. However, it will be understood that preferably the four-to-one factor is used with these designs.

Figure 12:
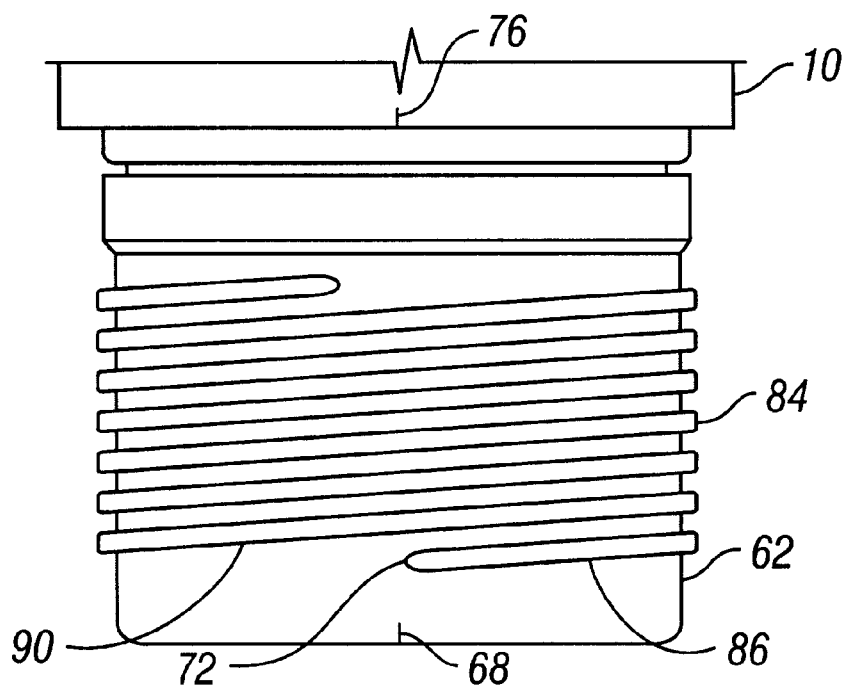
FIG. 12 is an elevational view, partially in phantom dash, that shows the orientation of the pin member with respect to the box member in accord with the present invention.
Figure 12:
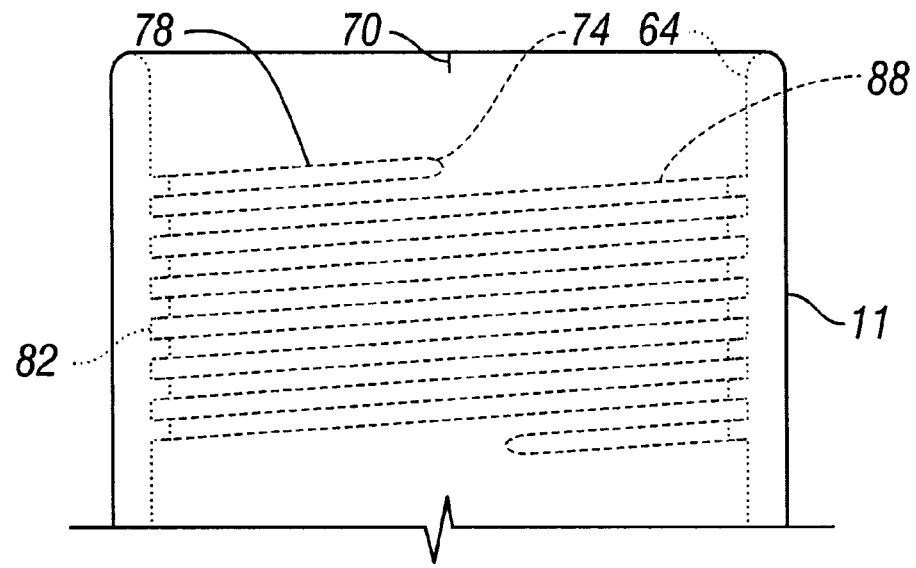

It has been found that threads may be easily damaged during initial contact. While the present invention guides the threads to avoid cross-threading, the present invention also provides a means for stabbing such that the stress forces due to initial contact of the threads is spread out over a wider area. For this purpose, alignment indicators 68 for pin 10 and 70 for box 11 may be used to align the threads for stabbing. FIG. 12 best shows the preferred alignment of pin 10 and box 11 for insertion or stabbing of pin 10 into box 11 because the orientation of the initial wrap of the box thread and pin thread can be seen in this view as discussed below. Alignment indicators 68 and 70, which may be referred to as first and second alignment indicators, may be of different types and located on various positions of pin 10 and box 11. However, alignment indicators 68 and 70 are circumferentially oriented with respect to pin thread beginning 72 and box thread beginning 74, respectively, to allow easy alignment of pin 10 and box 11 as described hereinafter. It is therefore not necessary that alignment indicators 68 and 70 be positioned as shown but rather that they simply be oriented so as to provide a means for orienting pin 10 and box 11 to provide an initial stab. Preferably alignment indicators 68 and 70 are marks that are visually easy to see and work with. Multiple indicators may also be used. For instance, an additional indicator 76 may be provided to allow continued visual review of the alignment as the stabbing process proceeds. Thus, a first alignment indicator such as alignment indicator 68 is positioned at a first selected circumferential distance with respect to said pin thread beginning 72. In this case, alignment indicator 68 and pin thread beginning 72 are at approximately the same circumferential position or distance but this need not be the case as discussed above. likewise in this example, alignment indicator 70 is located at approximately the same circumferential distance as box thread beginning 74.

Figure 10:
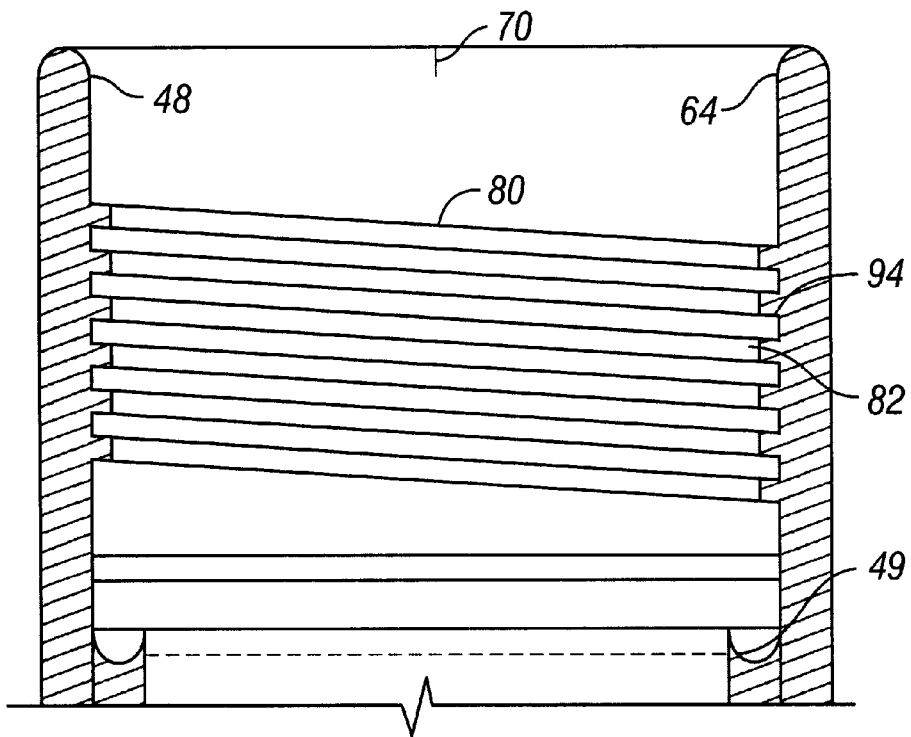
FIG. 10 is an elevational view, in section, of a box connection oriented for receiving the pin connection of FIG. 9.

Box thread 82 begins at box thread beginning 74 shown through box 11 in dash and, for purposes of this example, extends 180° around the circumference of box 11 to about point 80 in FIG. 10 which is 180° from box thread beginning 74. Thus, box thread 82 has a box thread beginning 74 and a box thread first wrap portion 78 extending one hundred eighty degrees around box 11 with respect to said box thread beginning 78.

Figure 13:
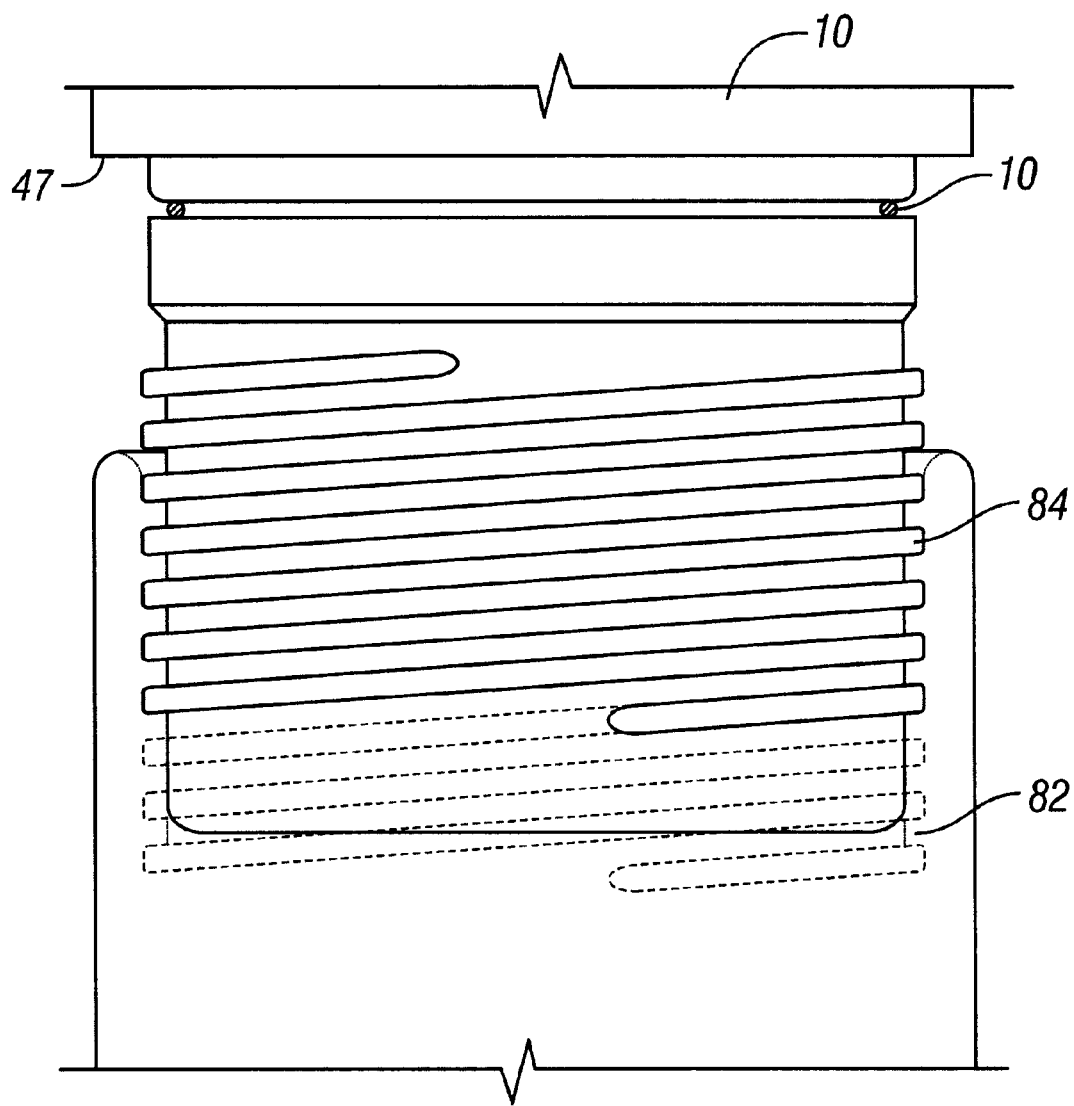
FIG. 13 is an elevational view, partially in phantom dash, that shows a pin member being made up into a box member.

Referring to FIG. 12, in a similar manner pin thread 84 has a pin thread beginning 72 and a pin thread first wrap portion 86 that extends 180° around the circumference of pin 10. It will now be seen that if the orientation is maintained during stabbing of pin 10 with respect to box 11 that first wrap portion 86 of pin thread 84 will engage a corresponding receiving portion 88 of box thread 82. If aligned closely, almost the entire 180° length of pin thread first wrap portion 86 will engage receiving portion 88 of box thread 82 thereby spreading out initial contact forces over a wide area. Likewise, box thread first wrap portion 78 that extends 180° around the circumference of box 11 will simultaneously engage a corresponding receiving portion 90 of pin thread 84. Thus, by using alignment indicators 68 and 70 for alignment purposes, the result is that substantially all 180° of pin first wrap portion 86 and substantially all 180° of box thread first wrap portion 78 will make initial contact so that combined almost 360° initial contact will be made. In a preferred embodiment, almost all 360° contact is made using alignment indicators 68, 70. Guide surfaces 62, 64 that centralize the tubulars 10, 11 with respect to each other are also involved in the process of simultaneous contact by radially guiding the mating threads into the desired contact. The almost 360° contact spreads out initial contact forces protecting the threads and also speeds the tightening process as indicated in FIG. 13. While a preferred embodiment would provide alignment indicators oriented to obtain close to 360°, the invention is not limited to this and would encompass alignment for a wider range such as from about 180° guided initial contact but preferably at least 300° guided initial contact.

Thus, the combination of features of the invention such as the alignment indicators 68, 70 to provide almost 360° contact, the guiding of threads to make initial contact, and the thread factor provide for protecting the thread and reinforcing the thread against large forces as well as expediting the make-up process.

Figure 9:
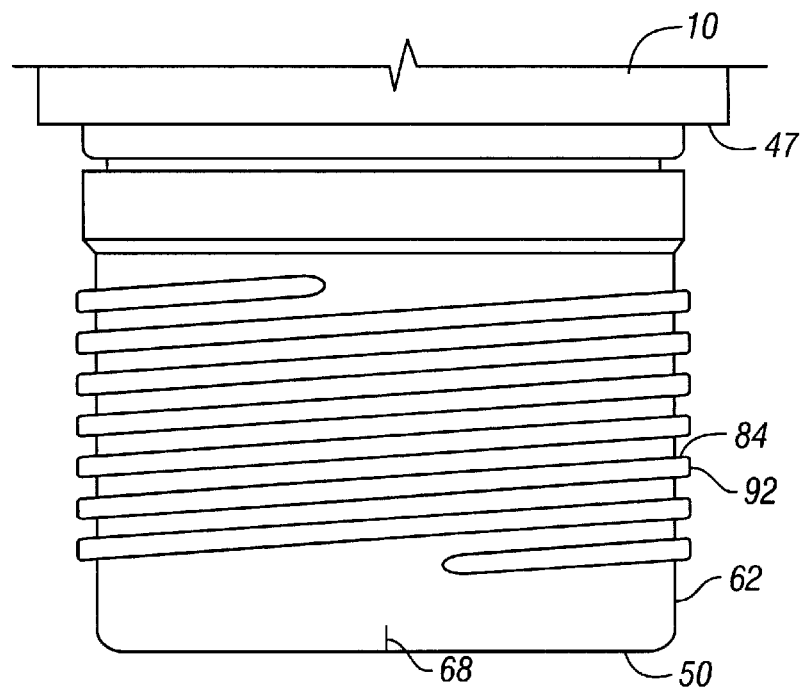
FIG. 9 is an elevational view of a pin connection oriented for stabbing into a box connection.

Reviewing guiding/centralizing of box 11 and pin 10 as per FIGS. 9 and 10, guide surface 64 of box 11 has substantially the same inner diameter as the outer diameter of crest surface 92 of pin thread 84. They are substantially equal but must differ by some small amount so as to be mating. Likewise, guide surface 62 of pin 10 has approximately the same outer diameter as crest surface 94 of box thread 82. The amount of difference in the diameters of guide surfaces and the crest surfaces of the threads may typically be in the range of less than about one-sixteenth inch. In one embodiment, a slight taper of about one-eighth inch per foot may even be provided to allow for easier stabbing and guidance while still centralizing and guiding the initial wraps into contact.

As discussed above, the axial length of guide surface 64 and 62 may be varied. In one presently preferred embodiment, the axial length is approximately equal to the axial length of about 180° of thread. In manufacturing, this amount may be cut back from end 50 as per FIG. 9. Thus, pin thread beginning 72 begins at an axial length from the end of guide surface 62, such as end 50 shown of FIG. 9, at an the axial length of about one-half of a thread. The same process may be effected on the box end such that the box thread beginning 74 is about the axial length of 180° worth of thread.

While the above is described in terms of single threads, it would also be possible to use multiple threads to accomplish 360° contact. For example, for a dual thread design with four threads for the box and the pin, each initial wrap portion would be about 90° and could be guided using indicators and guide surfaces as discussed above.

It may be seen from the preceding description that improved pipe connectors, particularly but not exclusively for use in connecting sections of a pipe string for drilling related purposes and especially useful for larger size tubulars such as those twenty-four inches in diameter and greater, is provided.

It is noted that the embodiment of the improved pipe connectors described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A threaded connector for connecting large diameter well bore tubulars, the connector comprising:

a first large diameter tubular comprising a pin member with at least one pin thread, said at least one pin thread having a pin thread beginning and a pin thread start portion extending up to one hundred eighty degrees around said first large diameter tubular with respect to said pin thread beginning, said at least one pin thread having a pin crest surface, said pin crest surface having a pin crest external diameter, said at least on pin thread defining a pin root surface, a pin axial length for said pin crest surface, a pin radial length between said pin root surface and said pin crest surface, said pin axial length being greater than said pin radial length by a pin thread factor;

a second large diameter tubular comprising a box member with at least one box thread, said at least one box thread having a box thread beginning and a box thread start portion extending up to one hundred eighty degrees around said second large diameter tubular with respect to said box thread beginning, said at least one box thread having a box crest surface, said box crest surface having a box crest inner diameter said at least on box thread defining a box root surface, a box axial length for said box crest surface, a box radial length between said box root surface and said box crest surface, said box axial length being greater than said box radial length by a box thread factor, at least one of said box thread factor or said pin thread factor being greater than about three and one-half;

a first alignment indicator on said first large diameter tubular, said first alignment mark indicator being positioned at a first selected circumferential distance with respect to said pin thread beginning; and a second alignment indicator on said second large diameter tubular, said second alignment indicator being positioned at a second selected circumferential distance with respect to said box thread beginning, said first and second selected circumferential distances being selected such that up to three hundred sixty degrees of said pin thread start portion and said box thread start portion in combination around a circumference of said threaded connector are oriented for making initial thread contact with corresponding portions of said at least one box thread and said at least one pin thread, respectively, when said first and second alignment indicator are in a previously determined orientation with respect to each other.

2. The threaded connector of claim 1, wherein:

said first and second selected circumferential distances are selected such that at least three hundred degrees or more of said pin thread start portion and said box thread start portion in combination around a circumference of said threaded connector are oriented for making initial thread contact with corresponding portions of said at least one box thread and said at least one pin thread, respectively, when said first alignment indicator and said second alignment indicator are in a previously determined orientation with respect to each other.

3. The threaded connector of claim 1, further comprising:

a first nose portion on said first large diameter tubular, said first nose portion having an outer guide surface with an external diameter substantially equal to said box crest internal diameter, said first indicator on said first large diameter tubular being disposed on said first nose portion.

4. The threaded connector of claim 3, further comprising:

a second nose portion on said second large diameter tubular, said second nose portion having an inner guide surface with an internal diameter substantially equal to said pin crest external diameter.

5. The threaded connector of claim 4, further comprising:

a first shoulder on said first large diameter tubular; and a second shoulder on said second large diameter tubular;

whereby said first shoulder is engageable with said second nose portion when said second shoulder is engageable with said first nose portion.

6. A threaded connector for connecting large diameter well bore tubulars, the connector comprising:

a first large diameter tubular comprising a pin member with at least one pin thread, said at least one pin thread having a pin thread beginning and a pin thread start portion extending up to one hundred eighty degrees around said first large diameter tubular with respect to said pin thread beginning, said at least one pin thread having a pin crest surface, said pin crest surface having a pin crest external diameter;

a second large diameter tubular comprising a box member with at least one box thread, said at least one box thread having a box thread beginning and a box thread start portion extending up to one hundred eighty degrees around said second large diameter tubular with respect to said box thread beginning, said at least one box thread having a box crest surface, said box crest surface having a box crest inner diameter;

a first nose end on said first large diameter tubular, said first nose portion having an outer guide surface with an external diameter substantially equal to said box crest internal diameter;

a first alignment indicator on said first large diameter tubular, said first alignment mark indicator being positioned at a first selected circumferential distance with respect to said pin thread beginning; and a second alignment indicator on said second large diameter tubular, said second alignment indicator being positioned at a second selected circumferential distance with respect to said box thread beginning, said first and second selected circumferential distances being selected such that up to three hundred sixty degrees of said pin thread start portion and said box thread start portion in combination around a circumference of said threaded connector are oriented for making initial thread contact with corresponding portions of said at least one box thread and said at least one pin thread, respectively, when said first and second alignment indicator are in a previously determined orientation with respect to each other.

7. The threaded connector of claim 6, further comprising:

a third alignment indicator, said first alignment indicator, said second alignment indicator, and said third alignment indicator defining a range between said first and second selected circumferential distances being selected such that between at least three hundred degrees and three hundred sixty degrees of said pin thread start portion and said box thread start portion in combination around a circumference of said threaded connector are oriented for making initial thread contact with corresponding portions of said at least one box thread and said at least one pin thread, respectively, when said first alignment indicator, said second alignment indicator, and said third alignment indicator are in a previously determined orientation with respect to each other.

8. The threaded connector of claim 6, further comprising:

said at least one pin thread defining a pin root surface;

an axial length for said pin crest surface; and a radial length between said pin root surface and said pin crest surface, said axial length being greater than about said radial length by a factor of approximately four.

9. The threaded connector of claim 6, further comprising:

a first nose end on said first large diameter tubular;

a first socket defined around an exterior circumference of said first large diameter tubular;

a second nose end on said second large diameter tubular;

a second socket defined around an interior circumference of said second large diameter tubular;

a drillable sleeve connected within an outer member, said sleeve forming a passageway there through between a first and second open end, said sleeve connectable within a pipe string; and at least one rib extending outwardly from the exterior of said sleeve for gripping a tool disposed within said sleeve, said rib extending substantially along the longitudinal axis of said sleeve;

whereby said first nose is engageable with said second socket and said second nose engageable with said first socket and said first nose, second nose, first second and said second socket are axially spaced for simultaneous engagement.

10. The threaded connector of claim 6, further comprising:
said first indicator on said first large diameter tubular being disposed on said first nose portion.

11. The threaded connector of claim 10, further comprising:
a second nose portion on said second large diameter tubular, said second nose portion having an inner guide surface with an internal diameter substantially equal to said pin crest external diameter.

12. The threaded connector of claim 11, further comprising:
a first shoulder on said first large diameter tubular; and
a second shoulder on said second large diameter tubular;
whereby said first shoulder is engageable with said second nose portion when said second shoulder is engageable with said first nose portion.

13. A threaded connector for connecting large diameter well bore tubulars, the connector comprising:
a first large diameter tubular comprising a pin member with at least one pin thread, said at least one pin thread having a pin thread beginning and a pin thread first wrap portion extending up to one hundred eighty degrees around said first large diameter tubular with respect to said pin thread beginning, said at least one pin thread having a pin crest surface, said pin crest surface having a pin crest external diameter;
a second large diameter tubular comprising a box member with at least one box thread, said at least one box thread having a box thread beginning and a box thread first wrap portion extending up to one hundred eighty degrees around said second large diameter tubular with respect to said box thread beginning, said at least one box thread having a box crest surface, said box crest surface having a box crest internal diameter;
a first nose portion on said first large diameter tubular, said first nose portion having an outer guide surface with an external diameter substantially equal to said box crest internal diameter;
a second nose portion on said second large diameter tubular, said second nose portion having an inner guide surface with an internal diameter substantially equal to said pin crest external diameter;
a first alignment indicator on said first large diameter tubular, said first alignment indicator being positioned at a first selected circumferential distance with respect to said pin thread beginning; and
a second alignment indicator on said second large diameter tubular, said second alignment indicator being positioned at a second selected circumferential distance with respect to said box thread beginning, said first and second selected circumferential distances being selected such that up to three hundred degrees of said pin thread first wrap portion and said box thread first wrap portion in combination around a circumference of said threaded connector are oriented for making initial thread contact with corresponding portions of said at least one box thread and said at least one pin thread, respectively, when said first and second alignment indicator are in a previously determined orientation with respect to each other.

14. The threaded connector of claim 13, wherein:
said first and second selected circumferential distances are selected such that at least three hundred degrees or more of said pin thread first wrap portion and said box thread first wrap portion in combination around a circumference of said threaded connector are oriented for making initial thread contact with corresponding portions of said at least one box thread and said at least one pin thread, respectively, when said first and second alignment indicator are in a previously determined orientation with respect to each other.

15. The threaded connector of claim 13, further comprising:
said at least one pin thread defining a pin root surface,
an axial length for said pin crest surface, and
a radial length between said pin root surface and said pin crest surface, said axial length being greater than about said radial length by a factor of approximately four.

16. The threaded connector of claim 13, further comprising:
a first nose end on said first large diameter tubular;
a first socket defined around an exterior circumference of said first large diameter tubular;
a second nose end on said second large diameter tubular; and
a second socket defined around an interior circumference of said second large diameter tubular;
whereby said first nose is engageable with said second socket and said second nose is engageable with said first socket, and said first nose, second nose, first socket, and said second socket are axially spaced for simultaneous engagement.

17. The threaded connector of claim 13, further comprising:
a first shoulder on said first large diameter tubular; and
a second shoulder on said second large diameter tubular;
whereby said first shoulder is engageable with said second nose portion when said second shoulder is engageable with said first nose portion.

18. A threaded connector for connecting large diameter well bore tubulars, the connector comprising:
a first large diameter tubular comprising a pin member with at least one pin thread, said at least one pin thread having a pin thread beginning and a pin thread first wrap portion extending up to one hundred eighty degrees around said first large diameter tubular with respect to said pin thread beginning, said at least one pin thread having a pin crest surface, said pin crest surface having a pin crest external diameter, said at least one pin thread defining a pin root surface, a pin axial length for said pin crest surface, a pin radial length between said pin root surface and said pin crest surface, said pin axial length being greater than said pin radial length by a pin thread factor;
a second large diameter tubular comprising a box member with at least one box thread, said at least one box thread having a box thread beginning and a box thread first wrap portion extending up to one hundred eighty degrees around said second large diameter tubular with respect to said box thread beginning, said at least one box thread having a box crest surface, said box crest surface having a box crest internal diameter, said at least one box thread defining a box root surface, a box axial length for said box crest surface, a box radial length between said box root surface and said box crest surface, said box axial length being greater than said box radial length by a box thread factor, at least one of said box thread factor or said pin thread factor being greater than about three and one-half;

a first nose portion on said first large diameter tubular, said first nose portion having an outer guide surface with an external diameter substantially equal to said box crest internal diameter; and a second nose portion on said second large diameter tubular, said second nose portion having an inner guide surface with an internal diameter substantially equal to said pin crest external diameter.

19. The threaded connector of claim 18, further comprising:

a first alignment indicator on said first large diameter tubular, said first alignment indicator being positioned at a first selected circumferential distance with respect to said pin thread beginning; and a second alignment indicator on said second large diameter tubular, said second alignment indicator being positioned at a second selected circumferential distance with respect to said box thread beginning, said first and second selected circumferential distances being selected such that at least three hundred degrees of said pin thread first wrap portion and said box thread first wrap portion in combination around a circumference of said threaded connector are oriented for making initial thread contact with corresponding portions of said at least one box thread and said at least one pin thread, respectively, when said first and second alignment indicator are in a previously determined orientation with respect to each other.

20. The threaded connector of claim 19, wherein:

said first and second selected circumferential distances are selected such that at least three hundred degrees or more of said pin thread first wrap portion and said box thread first wrap portion in combination around a circumference of said threaded connector are oriented for making initial thread contact with corresponding portions of said at least one box thread and said at least one pin thread, respectively, when said first alignment indicator and said second alignment indicator are in a previously determined orientation with respect to each other.

21. The threaded connector of claim 18, further comprising:

a first shoulder on said first large diameter tubular; and a second shoulder on said second large diameter tubular;

whereby said first shoulder is engageable with said second nose portion when said second shoulder is engageable with said first nose portion.

22. A threaded connector for connecting large diameter well bore tubulars, the connector comprising:

a first large diameter tubular comprising a pin member with at least one pin thread, said at least one pin thread having a pin thread beginning and a pin thread start portion extending up to one hundred eighty degrees around said first large diameter tubular with respect to said pin thread beginning, said at least one pin thread having a pin crest surface, said pin crest surface having a pin crest external diameter, said at least on pin thread defining a pin root surface, a pin axial length for said pin crest surface, a pin radial length between said pin root surface and said pin crest surface, said pin axial length being greater than said pin radial length by a pin thread factor;

a second large diameter tubular comprising a box member with at least one box thread, said at least one box thread having a box thread beginning and a box thread start portion extending up to one hundred eighty degrees around said second large diameter tubular with respect to said box thread beginning, said at least one box thread having a box crest surface, said box crest surface having a box crest inner diameter said at least on box thread defining a box root surface, a box axial length for said box crest surface, a box radial length between said box root surface and said box crest surface, said box axial length being greater than said box radial length by a box thread factor, at least one of said box thread factor or said pin thread factor being greater than about three and one-half;

a first nose portion for said first large diameter tubular;

a second nose portion for said second large diameter tubular;

a first shoulder on said first large diameter tubular; and a second shoulder on said second large diameter tubular whereby said first shoulder is engageable with said second nose portion and said second shoulder is engageable with said first nose portion.

23. The threaded connector of claim 22, further comprising:

a first alignment indicator on said first large diameter tubular, said first alignment indicator being positioned at a first selected circumferential distance with respect to said pin thread beginning; and a second alignment indicator on said second large diameter tubular, said second alignment indicator being positioned a second selected circumferential distance with respect to said box thread beginning, said first and second selected circumferential distances being selected such that up to three hundred sixty degrees of said pin thread first wrap portion and said box thread first wrap portion in combination around a circumference of said threaded connector are oriented for making initial thread contact, with corresponding portions of said at least one box thread and said at least one pin thread, respectively, when said first and second alignment indicator are in a previously determined orientation with respect to each other.

24. The threaded connector of claim 23, wherein:

said first and second selected circumferential distances are selected such that at least three hundred degrees or more of said pin thread start portion and said box thread start portion in combination around a circumference of said threaded connector are oriented for making initial thread contact with corresponding portions of said at least one box thread and said at least one pin thread, respectively, when said first alignment indicator and said second alignment indicator are in a previously determined orientation with respect to each other.

* * * * *